United States Patent [19]
Riener et al.

[11] Patent Number: 5,637,866
[45] Date of Patent: Jun. 10, 1997

[54] APPARATUS AND METHOD FOR OPTICALLY DETECTING AND ELECTRONICALLY ANALYZING THE LOCATION OF A PROJECTILE IN A TARGET PLANE

[76] Inventors: Karl S. Riener, Mullerviertel 20, 4563 Micheldorf, Austria; Erich Dollansky, Garmischer Allee 13, 86438 Kissing, Germany

[21] Appl. No.: 435,446

[22] Filed: May 5, 1995

[30] Foreign Application Priority Data

May 5, 1994 [DE] Germany ............... 44 15 944.7

[51] Int. Cl.$^6$ ................. G01D 5/34; F41J 5/00
[52] U.S. Cl. ............. 250/229; 250/206.1; 273/378; 356/4.08
[58] Field of Search ................ 250/222.2, 229, 250/206.1, 206.2; 273/317, 348, 378; 356/4.02, 4.08

[56] References Cited

U.S. PATENT DOCUMENTS

| | | |
|---|---|---|
| 3,047,723 | 7/1962 | Knapp . |
| 3,727,069 | 4/1973 | Crittenden, Jr. et al. . |
| 3,849,910 | 11/1974 | Greenly ............ 35/25 |
| 4,205,846 | 6/1980 | Levine . |
| 4,289,960 | 9/1981 | Smith et al. ............ 250/222.1 |
| 4,507,557 | 3/1985 | Tsikos . |
| 4,936,683 | 6/1990 | Purcell ............ 356/152 |
| 4,949,972 | 8/1990 | Goodwin et al. ......... 273/371 |
| 5,521,373 | 5/1996 | Lanier et al. .......... 250/203.2 |

FOREIGN PATENT DOCUMENTS

| | | |
|---|---|---|
| 0 182 397 | 5/1986 | European Pat. Off. . |
| 0 354 284 | 2/1990 | European Pat. Off. . |
| 0414658 A3 | 2/1991 | European Pat. Off. . |
| 0 525 733 A1 | 3/1993 | European Pat. Off. . |
| 2.082.131 | 12/1971 | France . |
| 37 05 142 A1 | 9/1988 | Germany . |
| 3815373 A1 | 11/1989 | Germany . |
| 31 32 172 C2 | 3/1990 | Germany . |
| 2196114 A | 4/1988 | United Kingdom . |
| WO8705688 | 9/1987 | WIPO . |

*Primary Examiner*—Stephone Allen
*Attorney, Agent, or Firm*—Dennis H. Lambert, Esq.

[57] ABSTRACT

The invention comprises a method, apparatus and equipment for detecting the hit location of a projectile passing through a target plane. A light source generates at least two zones of light which subtend between them a specified angle. The light zones sweep the target plane, illuminating a projectile crossing the target plane and casting a shadow of the projectile onto a screen, preferably a difuse, ground-glass screen. The screen shadow or image is detected by a spatially resolving photodetector, and the test signals so obtained are then analyzed as follows: the individual test signals from individual photodetector elements are integrated during one measurement cycle and the sum signals from individual detector elements so obtained are added or integrated into a final sum; the final sum is compared with a reference value; and in the event of a deviation from the reference value, the possibly darkened element of the photodetector is determined and the projectile location in the target plane is inferred therefrom.

17 Claims, 10 Drawing Sheets

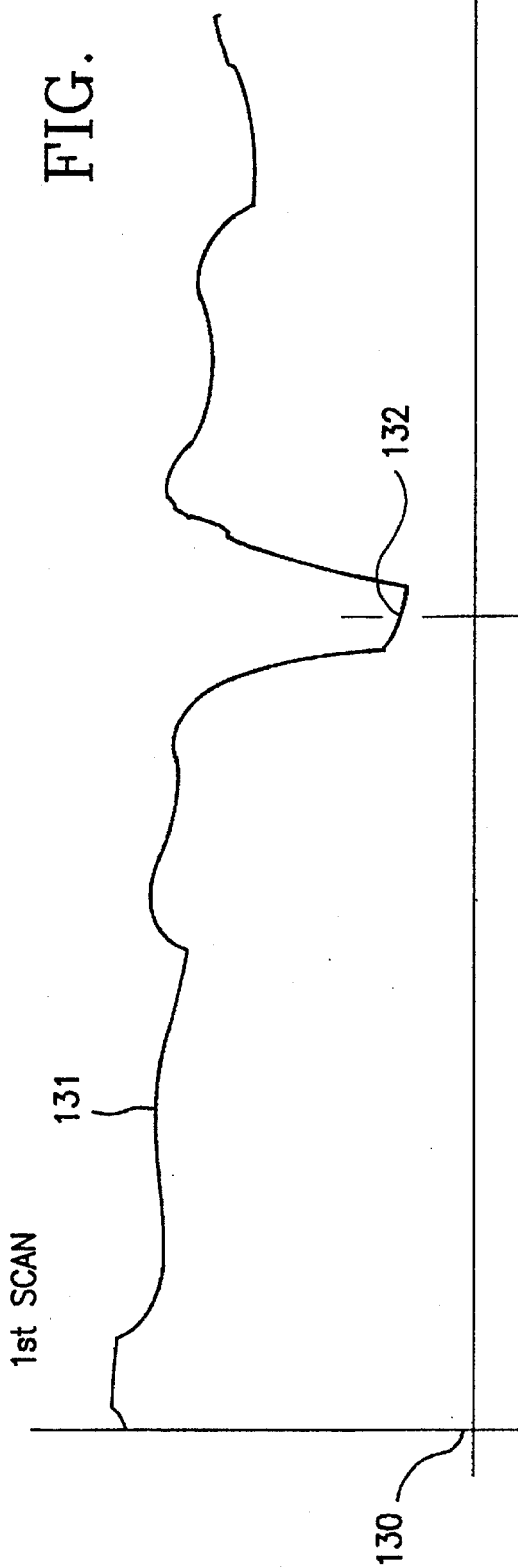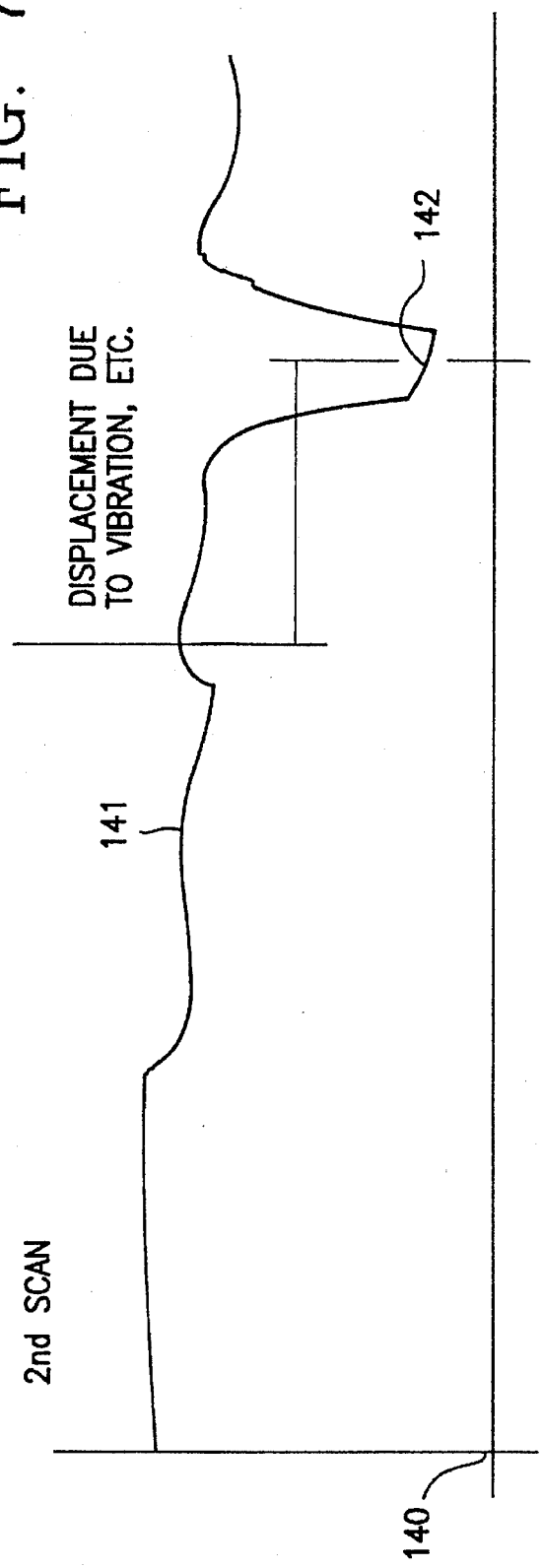

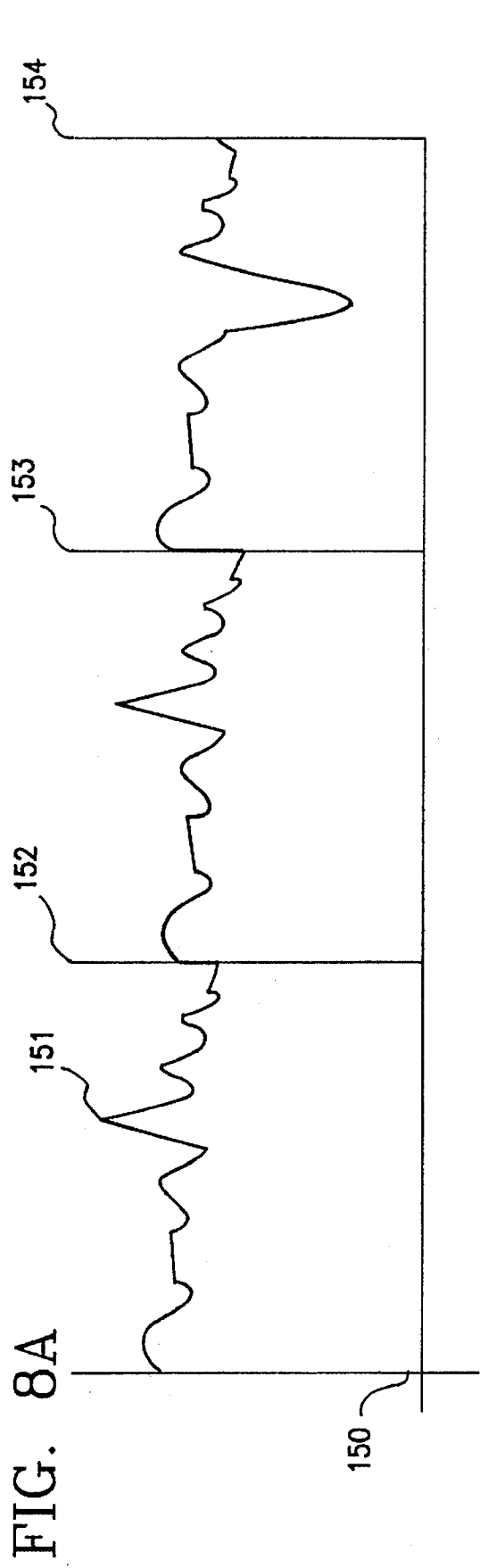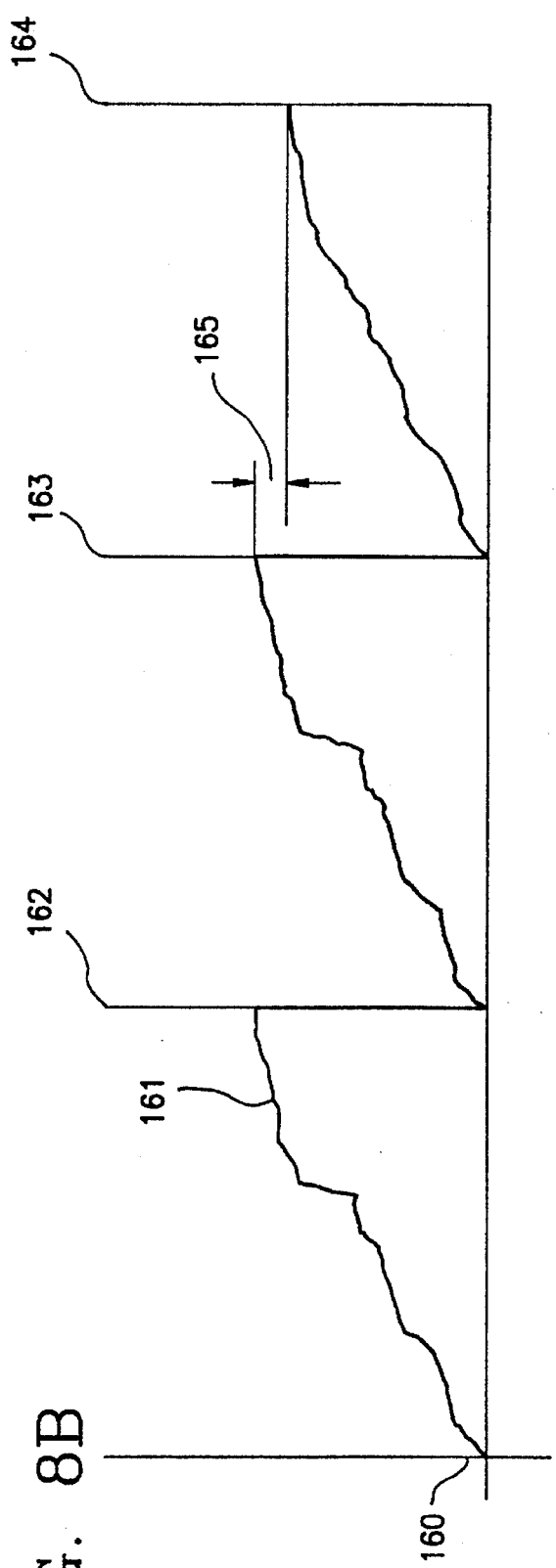

APPARATUS AND METHOD FOR OPTICALLY DETECTING AND ELECTRONICALLY ANALYZING THE LOCATION OF A PROJECTILE IN A TARGET PLANE

FIELD OF THE INVENTION

The present invention concerns a method and apparatus for detecting a projectile passing through a target, i.e. a fixture for target practice or training. Further, the invention relates to a method and apparatus and equipment for the ensuing analysis of the projectile's hit location in the target.

Background of the Invention

Electronic targets of the type referred to above are known in the art. For example, U.S. Pat. No. 3,047,723 describes a photoelectric target consisting of a number of light barriers of which the light beams intersect orthogonally. The projectile hit location is determined from the shadows falling on individual photodetectors. This system has the drawback of a complex optic system required for each pair of light source and photodetector.

Equally complex apparatus is disclosed in U.S. Pat. No. 3,727,069 to determine a projectile hit location. The target also consists of a plurality of light barriers with orthogonally crossing light beams. The hit location is ascertained from the shadows falling on individual photodetectors.

The European Patent document 0,414,658 A2 also shows a hit display apparatus. The projectile is reproduced by a complex optics and a low-level amplifier directly onto a line detector. The line detector is modulated automatically by means of aperture setting and polarization filter. Basically, the projectile approach must be detected using a microphone.

Summary of the Invention

The present invention, on the other hand, provides a simple, low-cost target for hit detection and analysis. This goal of the invention is achieved by the method and apparatus defined in the claims, and as hereinafter described.

The invention offers a method, apparatus and equipment for detecting a projectile passing through a target plane of an electronic target. To this end, the invention provides at least two zones of light, generated by at least one light source, said light zones sweeping the target plane and subtending between them a given angle or angles, in particular a right angle. A projectile passing through the target plane is illuminated by the light, and the particular shadow of the projectile passing through the minimum of two zones of light is imaged on at least one screen, such as a diffuse ground-glass screen, and the particular image of the minimum of one ground-glass screen is detected by at least one spatially resolving photodetector.

Preferably, the minimum of one light source shall generate at least two fans of light and the particular images on the minimum of one ground-glass screen are detected by at least one line detector composed of detector elements, in particular a charge-coupled device (CCD).

In a preferred embodiment variation of the invention, the fans of light are generated by a first, slit-aperture member mounted in front of the minimum of one light source, and/or the light of the light fan is then made to pass through a second slit-aperture stop mounted in front of the minimum of one ground-glass screen. As a result, the projectile image is improved. Moreover, on account of the stop or stops, it is possible to use point light sources generating light fans in the simplest possible manner.

In an especially preferred way, the light from the minimum of one light source is condensed or concentrated through a first optics or lens, and/or the particular images of the minimum of one ground-glass screen are reproduced by a second optics or lens on the minimum of one photodetector. Thereby, the particular image of the minimum of one ground-glass screen is independent of the size of the target.

Moreover, a so-called "contact image sensor" may be used in the form of a module composed of a glass pane, a fiber optics and a photodetector. This contact image sensor thus replaces the separate ground-glass screen, the second optics and the photodetector. The photodetector of this module is as large as the associated glass pane, that is, as large as the replaced ground-glass screen.

The location of the projectile in the target plane is determined in especially simple manner from the position of its particular shadows on the minimum of one photodetector and from the mutual locations of the light sources, in particular when using geometric optics.

Furthermore, the target of the invention provides a method and apparatus and equipment for analyzing a signal generated by the above-mentioned projectile-detecting apparatus in order to determine the hit location. In this procedure, the signals or individual signals from individual elements of the photodetector are integrated in a first integrator during one measurement cycle and the summed signals from individual detector elements so obtained are added (or integrated) using an adder (or a second integrator); the total is compared to a reference value in a comparator; and in the event of deviation from the reference value, the element or elements of the photodetector darkened in particular by the projectile shadow is or are determined using a calculator and thereby the projectile location in the target plane will be inferred.

Preferably, the first integrator is already contained within the photodetector.

In the event of deviation from the reference value, the darkened detector element or elements, and hence the position of the shadow, shall be determined preferably by comparing the integrated sum signals of the present measurement cycle with those of at least one preceding measurement cycle.

Preferably, the integrated sum signals and the total value of a specified number of measurement cycles shall be stored in an appropriate memory.

Preferably, the reference value is determined by means of the calculating unit as being the average of a number of stored sum-values of previous measurement cycles in the absence of darkening, To ascertain the effect of vibrations in the target, in particular in the photodetector, and to account for them in hit analysis, the calculator is designed to form the differential between an integrated sum signal and an associated reference sum signal (an internal sum signal), and to sum the differentials so obtained over all or nearly all differentials of one measurement cycle, and minimizing the sum of differentials so obtained by changing the relation between the integrated sum signals and the reference sum signals (i.e., the correlation of the sum signals of a measurement cycle on one hand with the sum signals of the preceding measurement cycle on the other hand, where appropriate, by merely shifting left or right the individual sum signals in a data array) and using the relation so obtained to correct the location of the darkened detector elements.

Preferably, the reference sum signal is determined in the form of the average of a number of stored signal sums of previous measurement cycles in the absence of darkening.

In especially advantageous manner, the light source illuminating intensity is controlled in such a way by a detector control unit that the photodetector element receiving the largest measurement signal shall be operating near its maximum rating.

An analog-digital converter converting the received test signals of the photodetector is provided for especially advantageous analysis.

To achieve complete analysis, an above-described analyzing means is coupled to a further, equivalent analyzing means in such manner that an x-y projectile position can be determined in the target plane.

In this manner, the present invention creates a simple, economical and virtual electronic target characterized both by precise and simple analysis of hit location. Instead of a conventional target configuration, the projectile path is detected optically in the target plane and then is analyzed electronically and displayed. As the projectile flies through the target plane of the electronic target, it is illuminated from both sides orthogonally to the light path by point light sources. The shadow so generated is projected onto two ground-glass screens. The shadow image on the screen is reproduced each time by a simple lens onto a line detector. The line detector converts the optical information into an electrical signal. Information of the projectile flight path is recovered from said signal. Using two line detectors mutually offset by 90°, the exact spatial flight position when the target plane is being crossed can be ascertained. An electronic circuit converts the spatial coordinates into the commonplace target-disk coordinates and displays the hit location on an associated monitor. When a body is illuminated by two continuously emitting point light sources mutually offset by 90° in a plane, then said body's position can be accurately determined using known mathematical methods.

The present invention detects/records the image of the generated shadow by means of electronic components and by the electronic analysis of location information so obtained. The radiation may be visible or invisible light. Because of the spectral sensitivity of typical commercial line detectors, infrared radiation is preferred.

Alternatively, a point light source may be fitted with a parabolic mirror and generate collimated light. The other light source must then be taken into account when converting the ascertained coordinates into absolute coordinates.

The above line detectors are widely known for converting optical information. A given number of photodetectors are uniformly arrayed in one row. Each individual detector converts the incident light energy into a proportional electrical signal. The result is integration of the illuminating intensity within one detector scan cycle. The level of the output signal is adjusted by properly selecting the time interval between the individual scans of the time of integration of the elements of the photodetector and the illumination intensity.

When a ground-glass screen is evenly illuminated by a light source and is imaged on a line detector, then all detector elements evince approximately the same output signal. If a body is present between the light source and the ground-glass screen, the elements falling into its shadow receive less light. Then the output signals of the latter elements will be lower. The position and width or diameter of the projectile can then be determined from the index numerals of the elements providing lower output signals.

In the absence of a slitted pane (slit-aperture member), the line detector will be illuminated during projectile flight by the light beamed in front of or behind the projectile onto the ground-glass screen and hence on the detector itself. If a slitted pane with a very narrow slit is placed between the projectile and the ground-glass screen, then the affected detector elements will be completely masked as the projectile flies by.

Projectile detection is faced with the problem of short observation time. The dwell time of the projectile in the target plane at projectile speeds of about 200 to 1,200 m/s is very short. When using the above slitted pane, the time of darkening caused by the projectile is critical. As regards a theoretically small slit, in spite of the above wide range in projectile speeds, the dwell time in front of the slit will always be about 30 µs. The reason is the substantial length of faster projectiles.

Because of the integrating effect of the line detectors, the integration time and hence the time between two line detector scans may be substantially larger than the darkening time. An illustrative scanning time of 60 µs is posited. If, in this case, the detector is darkened for 30 µs, then the output signal will be half of what it is in the absence of darkening. As a rule, the output level of the affected detector elements is attenuated in the ratio of the time of darkening to scan time. As the scan time rises, the level differences become less.

If line detectors are used of which the least time of integration is less than the darkening time, then the above considerations still apply. However, the possibility must be taken into account that darkening, i.e., a shadow image, might be distributed over two or more scan cycles. In such a case, however, the economic advantage of using slow and hence economical line detectors, previously available, will be lost.

The output signals from the particular detector elements basically differ from one another on account of manufacturing tolerances in the detector, the optics, ground-glass screen and slitted pane as well as on account of intensity dispersions of the light, i.e., illuminating source being used. In order that such differences do not lead to spurious conclusion of projectile flight, the signal levels of the particular detector elements are stored as reference values in a memory at one or more times when it is reliably known that no projectile is present in the target plane.

In order to analyze in simple manner the signals obtained in a scan cycle, the signal levels from each detector element also are stored in a memory. Accordingly, the analysis can be carried out a synchronously relative to the scan. If several memories are made available for the scans, a corresponding number of scan results may be used for analysis.

If the time interval between two scans of the line detector is longer than the maximum duration of darkening by the particular projectiles, the following effect shall always be present: because in this configuration the darkening may be spread at most over two scan cycles, then following one or two scan cycles evincing changed data, the initial condition must obtain again. If at least four cycles are stored, it is possible to incorporate an error checking procedure.

Signal changes covering more than two scan cycles are due to other causes and therefore need not be considered denoting projectile flight when analyzing the signal. Illustrative causes may be insects in the target plane or also fragments generated by projectile misses.

If now the signal levels of the individual detector elements from one scan cycle are either summed or integrated, then the result of such mathematical operation must remain approximately constant until a shadow falls on the ground-glass screen. In that case the above operational result must be lower. It is easier to implement such a procedure by integrating the signal using an analog integrator. Alternatively, the output data from the analog-digital converter can be easily summed on the digital side of the signal processing.

Alternatively to the above-described integration of the data from one measurement, i.e., scan cycle, the output signal from the line detector also may be advantageously subjected to Fourier analysis. For that purpose the control information must be removed from the data flow and it is necessary to artificially generate a data flow which contains only the data from the individual detector elements. This procedure can be implemented in that the digital data are converted back into analog data while taking into account the altered data rate, or by carrying out the Fourier analysis directly using the digital data.

As long as a projectile is absent from the target plane, the spectrum of the detector data is fixed. As soon as a projectile flies through the target plane, a minor change takes place in the spectrum. This change depends on the time of darkening and on the width of the shadow.

A target may be set into vibrations because of the rough environment at the applications site. As a result the above stated tolerances may vary in every scan cycle in a different way. In such a case the spurious darkening of a detector element may be merely a drop in signal level caused by a defect for instance in the ground-glass screen. The tolerances, per se, within a system being constant and the vibrations entailing only relative displacements, the combination of the stored scan results and the integration of all signal levels within one scan cycle allows significantly raising test-result reliability and accuracy. The stored signals from the actual measurement and of the reference measurements are so displaced relative to one another that they shall coincide at most points. Only the data from the darkened detector elements assume lower values in the measurement cycle.

The result is determined by associating the detector elements of lower output levels with their relative locations in the overall detector. The association of the shadow with the projectile is implemented by plain geometric optics. The detector elements with attenuated output levels are determined by comparison of such levels with the levels of the same detector element reference signals.

The configuration of the electronic target preferably may be either discrete or several functions may be combined in a single component. For example, the target may consist of a glass cylinder, the projectile flying through the cavity of said cylinder. The outer cylinder wall may be made matte or be printed or coated in such a way that all the glass body shall be opaque at the surface except the peripheral optical slit made matte at the sides of the line detector.

To monitor the hit display, preferably a conventional target may be mounted in such manner that a projectile having passed through the target plane of the electronic target immediately thereafter impacts the conventional target. The reverse design, that is wherein the projectile first pierces the conventional target, is undesirable because in addition to piercing, scattered parts of the conventional targets must be expected to materialize. Calibration is implemented by firing once or twice on the target. Using two diagonally opposite shots, any rotation of the conventional target may also be reliably detected and be transferred into the electronic target. The hit location at the conventional target is manually detected thereafter and relayed following hit recognition to the electronic target. Thereupon, the electronic target correspondingly converts the coordinates of all analyzed hits and displays them relative to the conventional target. The analysis is unaffected by the shots first being used for calibration or by an arbitrary number of shots being fired at the targets and then two arbitrary hits being used for calibration. Obviously, real-time display is possible only if the electronic target was previously calibrated.

In order that the hit location data on the conventional target can be fed in simple manner to the electronic target, the latter may be connected to a monitor with a graphic output. A conventional target is graphically shown on this connected monitor. To simplify the input, the hit location may be entered using a graphic input means, for instance a mouse, in the target-disk representation.

The adjustment of the mechanical system also may be automated. The light source, the two slitted panes, the ground-glass screen and the line detector must be arrayed in such a way that the light zone or fan be perpendicular to the projectile flight direction. Thereupon, the two slitted panes must be appropriately mounted in the beam path. The ground-glass screen must be mounted in such manner that the light zone or fan is incident perpendicularly. The line detector must be mounted parallel to the ground-glass screen. The light source optics must be adjusted so that the shadow of a projectile at the center of the target be imaged as sharply as possible on the ground-glass screen. The optics between the ground-glass screen and the line detector must be adjusted so that the shadow imaged on the ground-glass screen be sharply reproduced on the line detector.

The automated adjustment by means of the above-described techniques offers several advantages precisely when using the electronic target in a rough environment, for instance on a shooting range. It may be appropriate, depending on particular applications, that some parameters not be adjusted in automated manner. The automated adjustment of the line-detector position is especially significant. Because of the compactness of the individual detector elements, the overall detector must be aligned as accurately as possible.

The alignment may be implemented using various known servo-systems. The information of optimal detector position may be inferred from its output signal. The center of the light zone or fan can be looked for by displacing the detector perpendicularly to the light beam and perpendicularly to the array of its elements. If thereupon the detector is rotated in the same plane, the individual detector elements can be aligned precisely parallel to the light zone.

The line detector will thereupon be optimally adjusted when the differential between the best and worst illumination is minimized and in the process the average output signal from all detector elements becomes a maximum in the presence of constant illumination.

BRIEF DESCRIPTION OF THE DRAWINGS

The foregoing, as well as other objects and advantages of the invention, will be described in detail hereinafter, wherein like reference characters designate like parts throughout the several views, and wherein:

FIGS. 7A and 7B show the line-detector output signal from two different scans;

FIGS. 8A and 8B show the integral of the output signal of a line detector;

DETAILED DESCRIPTION OF THE PREFERRED EMBODIMENTS

Figure 1:
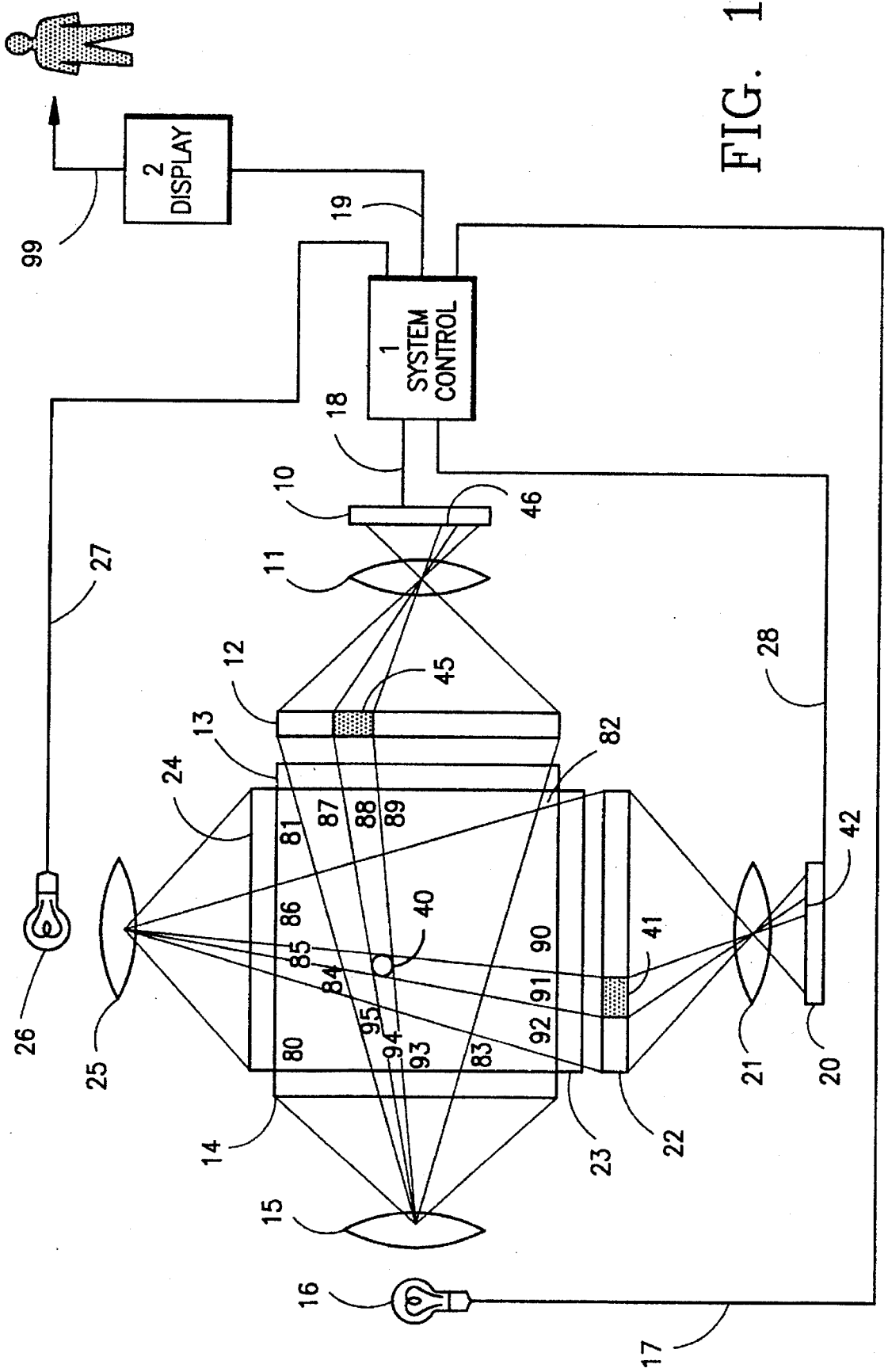
FIG. 1 shows the design of an apparatus detecting or recording a projectile at the electronic target of the invention.

Referring more particularly to the drawings, FIG. 1 shows a preferred embodiment of apparatus for detecting or recording a projectile of the electronic target of the invention.

A light source 16 illuminates a screen 12, which may comprise a diffuse, in particular a ground-glass screen, through an optics (lens) 15. An optics (lens) 11 reproduces the shadow 45 of a projectile 40 on the ground-glass screen 12 onto a line detector 10. Through a cable 18, the line detector 10 transmits the acquired information to a system control 1. Through a cable 17, the system control adjusts the illumination intensity from the light source 16 on the line detector 10.

Slitted panes (slit-aperture members) 14 and 13 are placed in the beam path of the light source 16.

A light source 26 illuminates a second ground-glass screen 22 through an optics (lens) 25. An optics (lens) 21 reproduces the shadow of the projectile 40 on the ground-glass screen 22 onto a line detector 20. The line detector 20 transmits the acquired information through a cable 28 to the system control 1. In turn, the system control 1 adjusts through a cable 27 the illumination intensity from the light source 26 on the line detector 20.

Slitted panes 24 and 23 are inserted in the beam path of the light source 26.

The electronic system control 1 coordinates all sequences and calculates the projectile location. The system control 1 transmits the acquired information through a cable 19 to a display 2. This display shows the test result in the desired form.

If the projectile 40 is located in the target plane of the target, it will project two shadows 41 and 45. The illumination of the light source 26 generates the shadow 41. This shadow 41 is reproduced by the optics (lens) 21 onto the line detector 20 as a shadow image 42. The light source 16 generates the shadow 45. This shadow 45 is reproduced by the optics (lens) 11 onto the line detector 10 as a shadow image 46.

For specified slit lengths in the slitted panes 13, 14 and 23, 24, and when using point light sources 16, 26, zones 80–83 are generated that are free from illumination by the two light sources 16, 26, and zones 84–95, are generated, which are illuminated by only one of the light sources 16, 26. If a projectile 40 passes through the target plane in one of the zones 80–95, the hit location will be indeterminate. As a consequence, the electronic target must be designed so that the virtual target surface must be located within the region enclosed by the zones 80–95. The target area in conventional targets is shown circular. If the target circle is fitted into the inner region, practical application will be restriction-free.

The user may take cognizance conventionally of the shooting tests using a visual display 99. The optic axes of the lenses 15 and 11 on one hand, and the lenses 25 and 21 on the other, are orthogonal.

Figure 2:
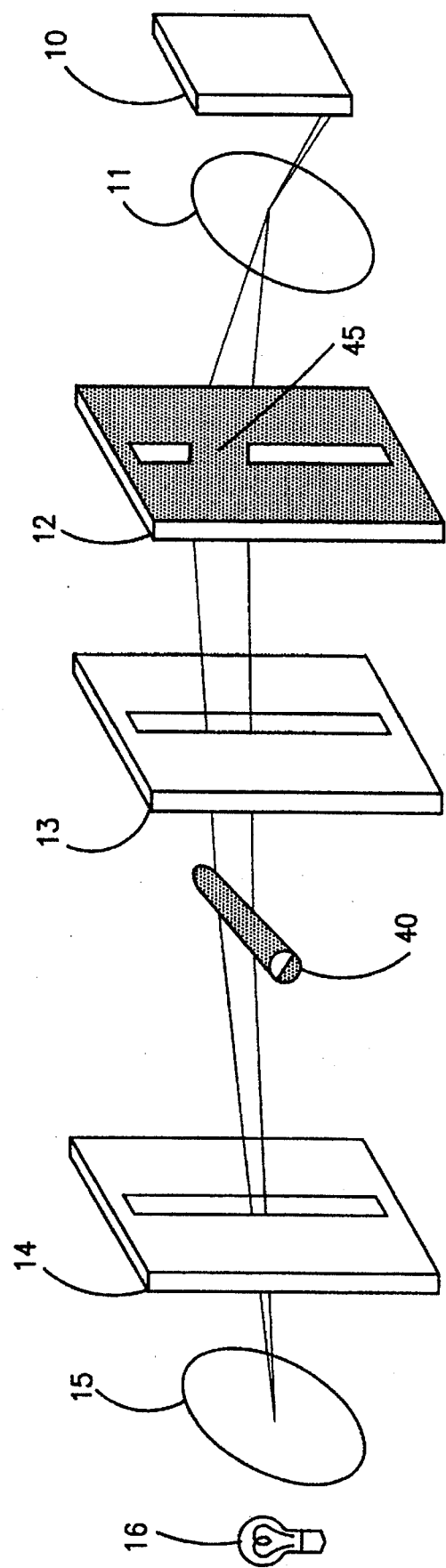
FIG. 2 is an enlarged, somewhat schematic, perspective side view of a projectile passing through the target.

FIG. 2 shows in detail the projections subtended by a projectile 40 passing through the electronic target. Only one dimension is shown. The light source 16 illuminates the ground-glass screen 12 through an optics (lens) 15. The two slitted panes 13 and 14 are placed in the beam path. The shadow 45 is reproduced by the optics (lens) 11 onto the line detector 10.

As the projectile 40 passes through the target plane, it is illuminated by the light source 16. The generated shadow 45 is reproduced onto the ground-glass screen 12. The shadow 45 is reproduced according to geometric optics.

The two slitted panes 13 and 14 are used for several purposes. On one hand they protect the apparatus from transverse impacts. On the other hand the slit of the pane 13 protects the line detector 10 against stray light. In addition, while a projectile 40 is present in the target plane between the two panes 13 and 14, the slitted pane 13 completely covers those elements in the line detector 10 which are associated with the projectile height of flight.

Figure 3:
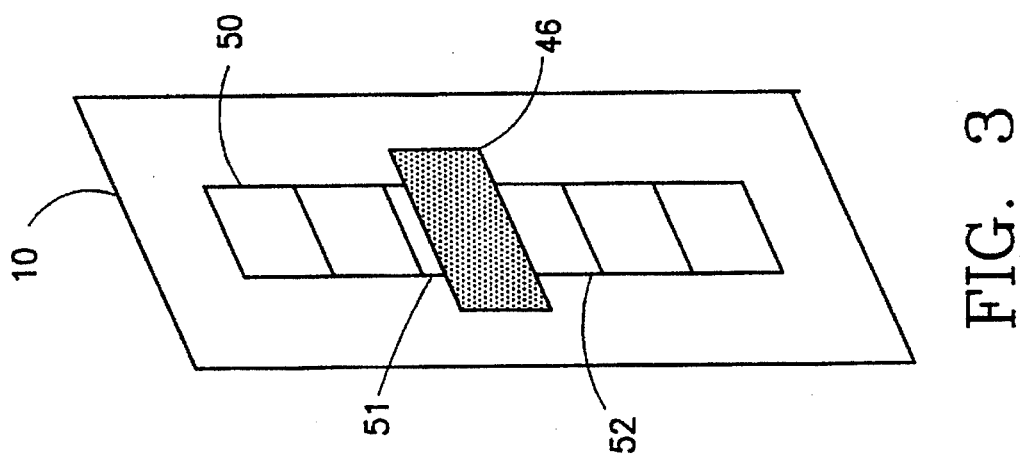
FIG. 3 is an enlarged top perspective view of a partly darkened photodetector.

FIG. 3 is a symbolic line detector 10. This line detector 10 consists of serial elements 50, 51, 52. As soon as the projectile 40 is located between the light source 16 and the ground-glass screen 12, the elements 51, 52 are darkened by the shadow 46. Accordingly, the output signal from the affected elements 51 and 52 will be lower at the next scan.

Figure 4:
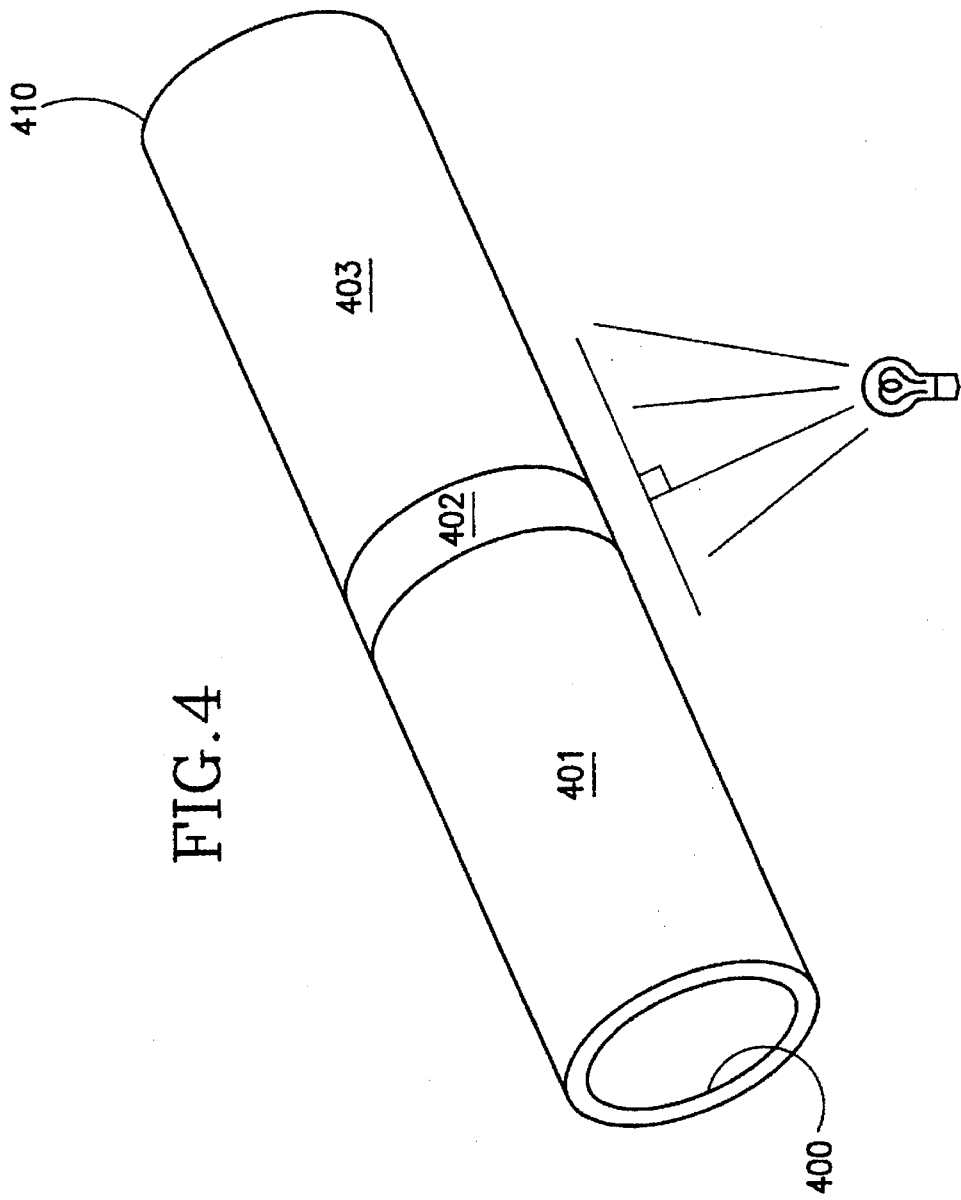
FIG. 4 is a perspective view of a variation of the design of FIG. 1.
Figure 5:
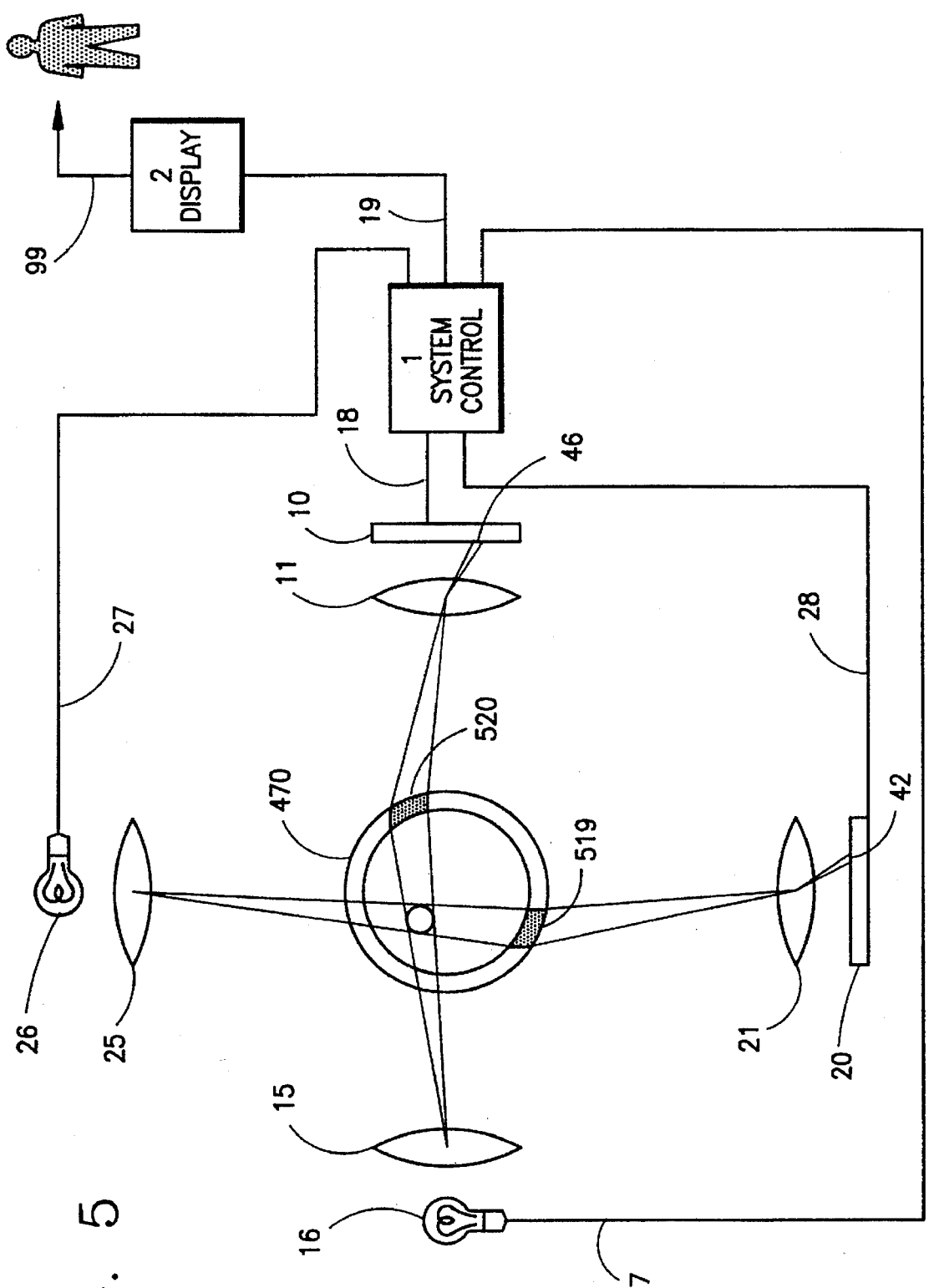
FIG. 5 is another design of an apparatus to detect or record a projectile using the principles of the electronic target of the invention.

FIGS. 4 and 5 show an alternative design of the electronic target. As seen best in FIG. 4, an alternative mechanical construction relating to the apparatus of FIG. 1, e.g., a cylinder 410 made of a material transparent at the particular light radiation, for instance glass, is mounted in such manner that the projectile 40 is able to enter the cylinder 410 at its entry aperture 400. At its periphery, the cylinder 410 is completely coated in two separate zones 401 and 403 in order to be opaque with the light being used orthogonally to the flight direction of the projectile 40. An uncoated zone 402 is present between the coated zones 401 and 403. This zone 402 serves as a simple optical slit on both sides of the light sources 16 and 26. On both sides of the line detectors, the zone 402 serves as slit and at the same time as a ground-glass screen. In order that point light sources 16 and 26 may be used, the diffuse surface must be so distributed over the periphery of the uncoated zone 402 that on the sides of the light sources 16 and 26, the incident light shall not be scattered while the sides opposite the line detectors 10, 20 of the cylinder 410 shall be diffuse.

As seen best in FIG. 5, the light from the source 16 is directed through the optics (lens) 15 onto the cylinder 410. When the projectile is in the target plane, a shadow 520 of the projectile 40 is formed on the opposite side of the cylinder 410. The shadow 520 is projected by the optics 11 onto the line detector 10. Consequently, the optics (lens) 11 must be such as to correct for the curvature of the cylinder 50. The output signal from the line detector 10 is fed through the cable 18 to the system control 1.

The light from the source 26 is directed through the optics (lens) 25 onto the cylinder 410. When a projectile 40 is present in the target plane, a shadow 519 from the projectile 40 is produced on the opposite side of the cylinder 410. The shadow 519 is projected by the optics (lens) 21 onto the line detector 20. The optics (lens) 21 must be such that it corrects for the curvature of the cylinder 50. The output signal of the line detector 20 is fed through the cable 28 to the system control 1.

The optic axes of the lenses 15 and 11 are orthogonal to the optic axes of the lenses 25 and 21.

The light source 16 is connected by the signal cable 17 to the system control 1. The system control I adjusts the brightness of the source 16 through the signal cable 17.

The light source 26 is connected through the signal cable 27 to the system control 1. The system control I adjusts the brightness of the source 26 through the signal cable 27.

The line detector 10 is connected through the signal cable 18 to the system control 1. The line detector 10 transmits the image data through the signal cable 18 to the system control 1.

The line detector 20 is connected through the signal cable 28 to the system control 1. The line detector 20 transmits the image data through the signal cable 28 to the system control 1.

The system control 1 is connected through the signal cable 19 to the display 2. The system control 1 transmits the data to be displayed through the signal cable 19 to the display 2.

Figure 6A:
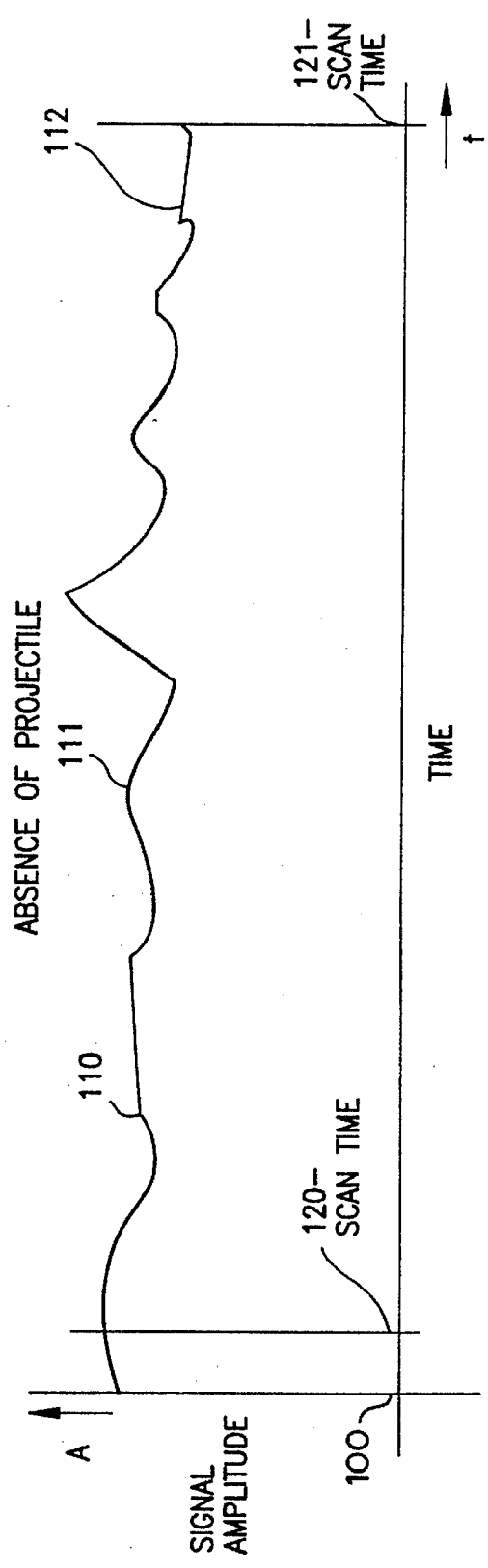
FIGS. 6A and 6B show the idealized output signal of a line detector.
Figure 6B:
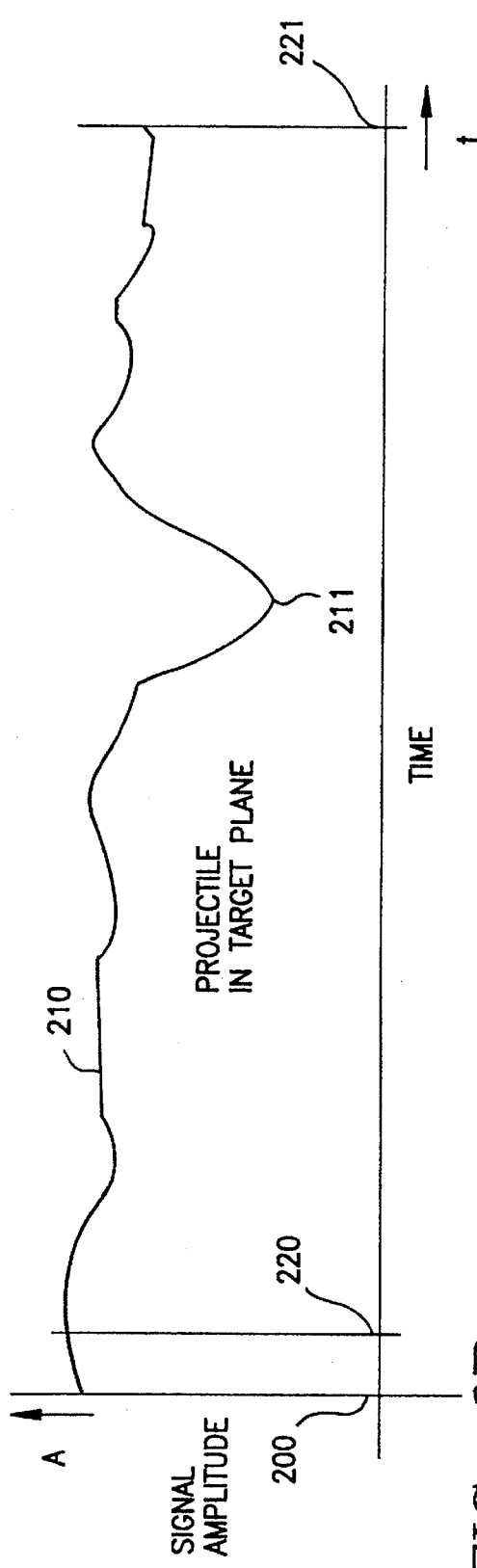

FIGS. 6A and 6B show two idealized output signals 110, 210 of a line detector 10, 20 as diagrams 100, 200, respectively. The x-axis is the time and the y-axis is the signal amplitude. The diagram 100 represents the output signal 110 of the line detector 10 or 20 from the electronic target in the absence of a projectile 40 in the target plane. Within one measurement cycle, that is, within two scan times 120 and 121, the output voltages from the individual detector elements 50, 51 or 52 at a time 120 are sequentially retrieved. The retrieval sequence of the output voltages depends on which line detector 10, 20 is used. For simplicity it is assumed that at time 120, it is the output signal from the first detector element 50 which is retrieved.

In lieu of the expected uniformity of the shown output signals 110, there are significant differences in the signal levels, for instance 111 and 112, from the particular detector elements 50, 51 or 52.

The diagram 200 shows the output signal 210 from the line detector 10 or 20 from the electronic target with the projectile 40 in the target plane. The time function of the output signal 210 substantially corresponds to the time function of the output signal 110, in this case between the scan times 220 and 221 of one measurement cycle. The output signal 210 evinces a marked drop 211 in the vicinity of several detector elements 50, 51 or 52. This drop 211 is caused by a projectile 40 casting a shadow on the detector elements 51, 52. The location of the signal drop 211 relative to the onset of the scan time 220 denotes the location of the projectile 40 in the target plane.

For analysis, the output signals 110 and 210 are mutually shifted until the difference between the two signals 110 and 210 is a minimum.

FIGS. 7A and 7B show two diagrams 130, 140 with two output signals 131, 141 of the line detector 10 or 20 from two different scans.

The diagram 130 shows the output signal 131 from a line detector 10 or 20 during the first scan. The diagram 140 shows the output signal 141 from the same line detector 10 or 20 during a second scan. As the scans are carried out, the full electronic target is undergoing vibrations.

Though exaggerated, the vibrations cause slight displacements between the components 10–16 and 20–26 of the electronic target. The output signal 141 is altered accordingly. Depending on the direction of displacement, image data are pushed beyond one end of the line detector 10 or 20, while new data are shown at the other end of the line detector 10 or 20.

Because of the high resolution of the line detectors 10, 20 used, a few microns suffice to incur such an effect.

The displacement between the signals 131 and 141 must be precluded from denoting a hit. The displacement between the signals 131 and 141 changes with the vibration of the electronic target. This displacement is especially clear in the vicinity of a shadow 132 and 142.

FIGS. 8A and 8B show the integral of an output signal 151 from the line detectors 10 or 20 in two diagrams 150, 160, respectively. If the signal 151 of the diagram 150 is integrated by an integrator always reset at the beginning of a scan time 152, 153 or 154 or, respectively, 162, 163 or 164, then this output signal 161 will assume the approximate shape of the curve shown in the diagram 160.

The time function of the output signal 151 evinces a notch in the output signal 151 between the scan times 153 and 154, said output signal 151 being from the undarkened line detectors 10 or 20 at those times. Between the times 153 and 154, the output signal 151 indicates darkening.

The time function of the output signal 161 shows the typical integral of the output signal 151 from an undarkened line detector 10 or 12 between the scan times 162 and 163. As shown by FIGS. 8A and 8B, darkening of the associated line detector 10 or 20 takes place between the times 163 and 164. The value of the integral at time 164 then falls short of the value of the integral at time 163. If at the end of the scan cycles of various scans the difference 165 of the integral values exceeds a given magnitude, it must be assumed that a projectile 40 entered the target plane. If, simultaneously, darkening can be ascertained within the same time interval in the output signal 151, then a projectile 40 has reliably reached the target plane.

Accordingly, by comparing the integral values at the end of a scan sequence, the passage of a projectile 40 can be reliably and conveniently ascertained.

Figure 9:
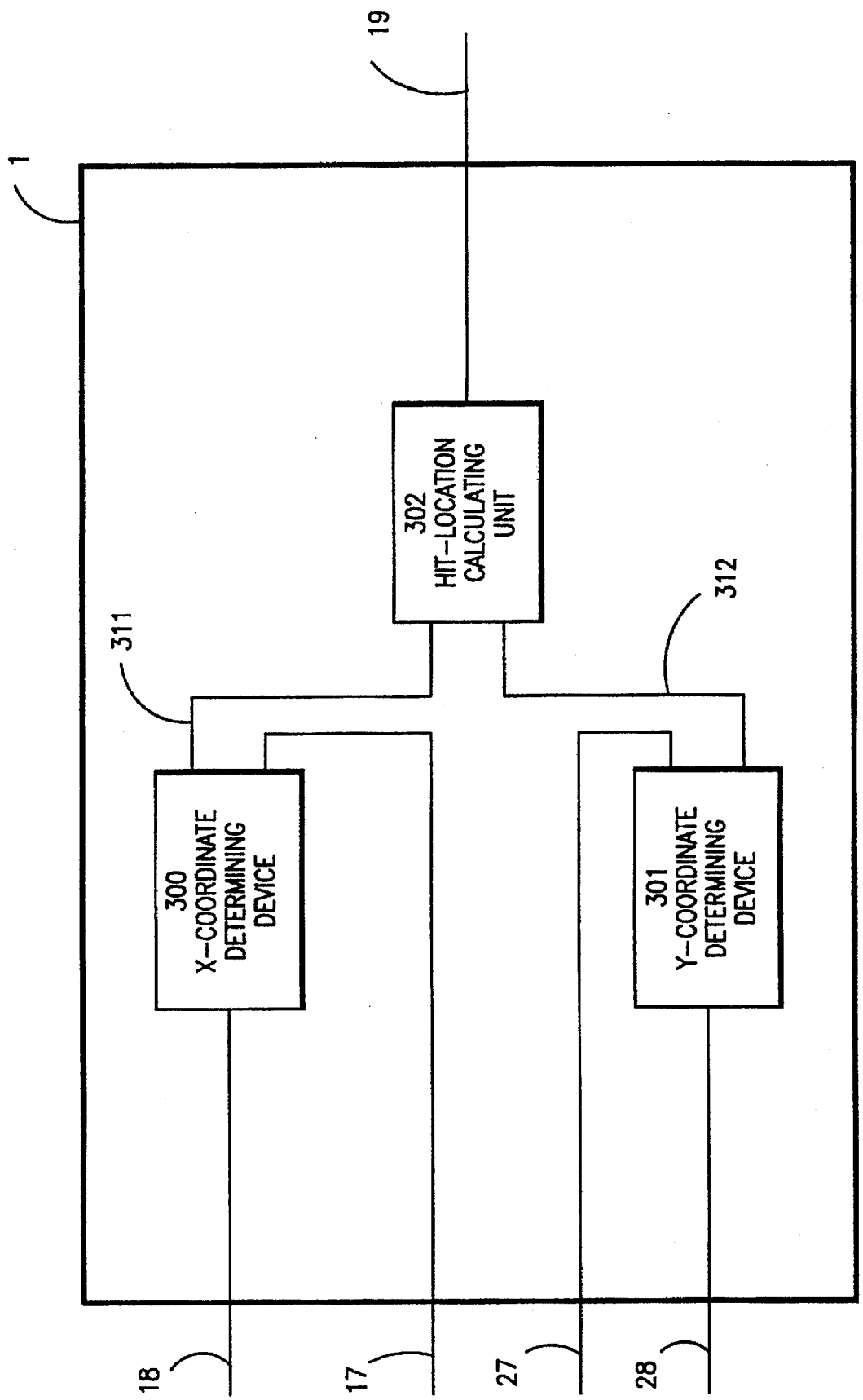
FIG. 9 is a functional block diagram of the system control of the invention.

FIG. 9 shows schematically the internal design of the system control 1. An x-coordinate determining device 300 is connected through a cable 18 to the line detector 10. The x-coordinate determining device 300 furthermore is connected by a cable 17 to the light source 16.

A y-coordinate determining means 301 is connected by a cable 28 to the line detector 20. The cable 27, moreover, connects the y-coordinate determining device 301 to the light source 26.

A cable 311 connects the x-coordinate determining device 300 to a hit-location calculating unit 302. A cable 312 connects the y-coordinate determining means 301 to the hit-location calculating unit 302.

The x-coordinate determining device 300 exchanges data with the line detector 10 through the cable 18. The y-coordinate determining device 301 exchanges data through the cable 28 with the line detector 20.

The x-coordinate determining device 300 exchanges data through the cable 311 with the hit-location calculating unit 302. The y-coordinate determining device 301 exchanges the coordinates with the hit-location calculating unit 302 through the cable 312.

The hit-location calculating unit 302 is connected through the signal cable 19 to the display 2. The hit-location calculating unit 302 transmits the hit coordinates through the cable 19 to the display 2.

Figure 10:
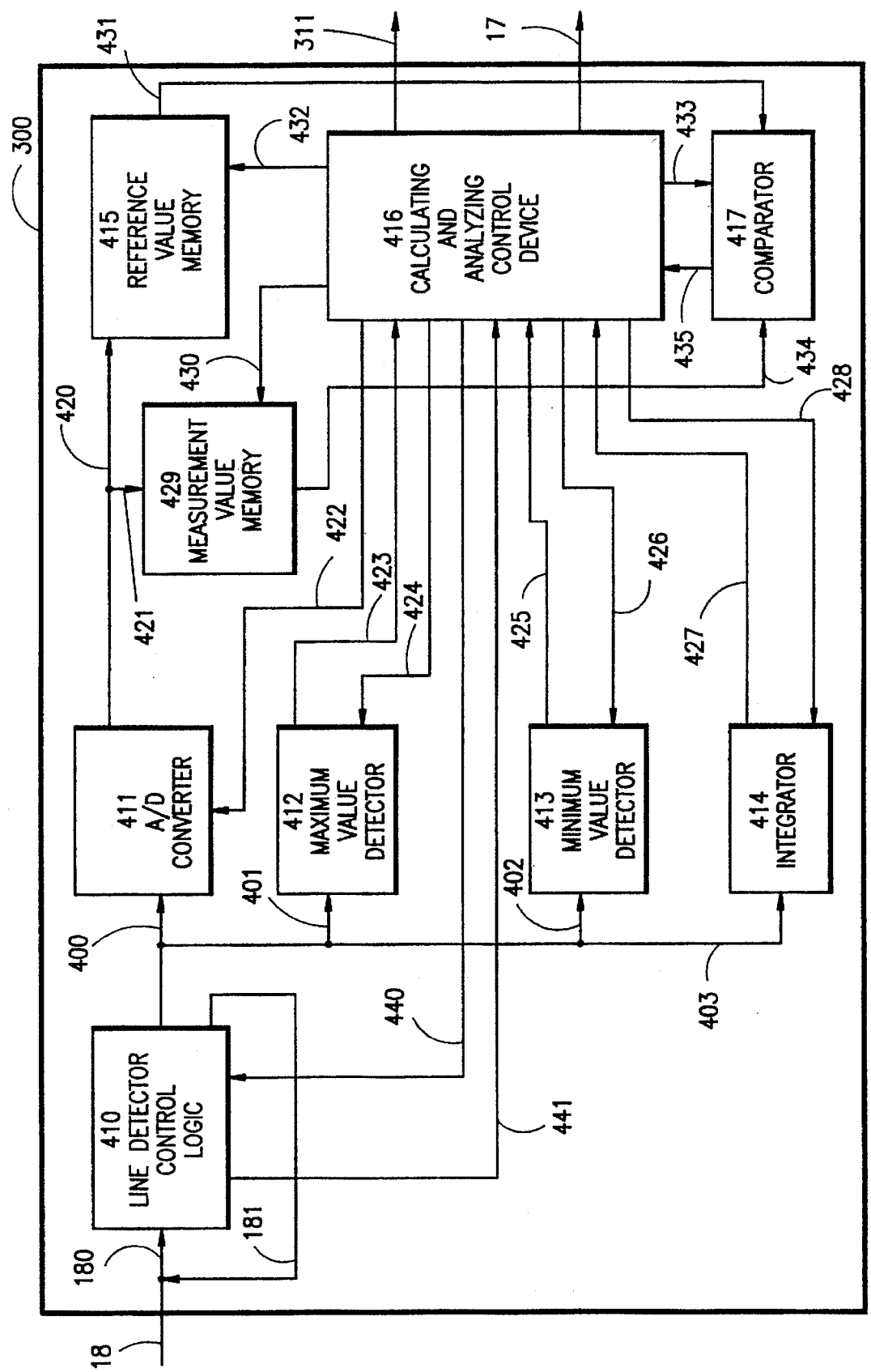
FIG. 10 is a detailed functional block diagram of a coordinate-determining device.

FIG. 10 shows in detail an x-coordinate determinating device 300. Herebelow only the internal design of an x-coordinate determining device will be discussed. The internal design of a y-coordinate determining device is wholly analogous.

A detector control unit, in this instance a line detector control logic 410, is connected by the cable 18 to the line detector. A signal 180 on cable 18 contains the image data from the line detector 10. The image data are transmitted through the cable 18 to the line detector control logic 410. A feedback signal 181 on cable 18 contains the data with which to control the line detector 10. The line detector control logic 410 is connected through a signal cable 400 to an analog/digital (A/D) converter 411. The present analog image data are transmitted through the signal cable 400 to the analog/digital converter for conversion into digital image data.

The line detector control logic 410 is connected through a signal cable 401 to a maximum-value detector 412. The present analog image data are transmitted through the signal cable 401 to the maximum-value detector 412 to determine the maximum signal level and the time at which it occurred within a scan cycle.

The line detector control logic 410 is connected through a signal cable 402 to a minimum-value detector 413. The present analog image data are transmitted through the signal cable 402 to the minimum-value detector 413 to determine the minimum signal level and its time of occurrence within a scan cycle.

The line detector control logic 410 is connected through a signal cable 403 to an integrator 414. The present analog image data are transmitted through the signal cable 403 to the integrator 414.

A calculating unit, i.e. an analytical control device 416 is connected through a signal cable 440 to the line detector control logic 410. The line detector control logic 410 is connected to the analytical control device 416 by a signal cable 441. The line detector control logic 410 is driven from the analytical control device 416 through the signal cable 440. The line detector control logic 410 transmits the synchronization data for the various sequences through the signal cable 441 to the analytical control device 416.

The analog/digital converter 411 is connected by a signal cable 420 to a reference-value memory 415. The analog/digital converter 411 is connected through a signal cable 421 to a measurement-value memory 429.

The analog/digital converter 411 transmits the converted data as a digital flow through the signal cable 420 to the reference-value memory 415. The analog/digital converter 411 transmits the converted data in the form of a digital flow through the signal cable 421 to the measurement-value memory 429.

The maximum-value detector 412 is connected by a signal cable 423 to the analytical control device 416. The analytical control device 416 is connected by a signal cable 424 to the maximum-value detector 412. The maximum-value detector 412 transmits the time and level of the maximum value in the last complete scan through the signal cable 423. The analytical control device 416 transmits scan cycle synchronizing data through the signal cable 424 to the maximum-value detector 412.

The minimum-value detector 413 is connected by a signal cable 425 to the analytical control device 416. The analytical control device 416 is connected by a signal cable 426 to the minimum-value detector 413. The minimum-value detector transmits the time and level of the minimum signal in the last scan through the signal cable 425 to the minimum-value detector 416. The analytical detector control 416 transmits the scan cycle synchronizing data through the signal cable 426 to the minimum-value detector 413.

From the data of one scan cycle, the integrator 414 forms the integral value which is stored in a memory, and, from the comparison of the integral values of the various scan cycles, determines whether a projectile passed through the target plane.

The integrator 414 is connected by a signal cable 427 to the analytical control device 416. The presumption that a projectile 40 passes through the target plane is communicated through the signal cable 428 to the analytical control device 416.

The analytical control device 416 is connected through a signal cable 428 to the integrator 414. The synchronizing data are transmitted from the analytical control device 416 through the signal cable 427 to the integrator 414.

The analytical control device 4.16 is connected through a signal cable 432 to the reference-value memory 415, in. The analytical control device 416 communicates through the signal cable 432 to the reference-value memory 415 which data from the signal cable 420 should be stored, and which data from the reference-value memory 415 should be fed from the reference-value memory 415 through a signal cable 431 to a comparator 417. For this purpose, the reference-value memory 415 is connected by a signal cable 431 to the comparator 417.

The analytical control device 416 is connected by a signal cable 430 to the measurement-value memory 429. The analytical control device 416 communicates through the signal cable 430 to the measurement value memory 429, to which input data should be stored through the signal cable 421, and which stored data should be transmitted through a signal cable 434 to the comparator 417. For that purpose the measurement value memory 429 is connected by the signal cable 434 to the comparator 417.

The analytical control device 416 is connected by a signal cable 433 to the comparator 417. The comparator 417 is connected by a signal cable 435 to the analytical control device 416.

The analytical control device 416 controls the comparator 417 through the signal cable 433. The comparator 417 transmits the comparison result through the signal cable 435 to the analytical control device 416.

The analytical control device 416 is connected by a cable 422 to the analog/digital converter 411. The signal cable 422 transmits the synchronizing data to the analog/digital converter 411.

By comparing the data of a measurement cycle with the data of a reference cycle, the comparator 417 ascertains the hit location from the resulting value.

The analytical control device 416 is connected by the signal cable 311 to the hit location calculating unit 302 (see FIG 9).

The analytical control device 416 communicates the data of projectile flight to the coordinate determining unit 302 through the signal cable 311.

The analytical control device 416 controls the brightness of the light source 16 through the signal cable 17. The brightness of the light source 16 is adjusted in such manner by the analytical control device 416 that the output signal from the detector element of the line detector 10 that is most intensely illuminated by the light source 16 reaches just the maximum rating for full modulation or is slightly less.

Figure 11:
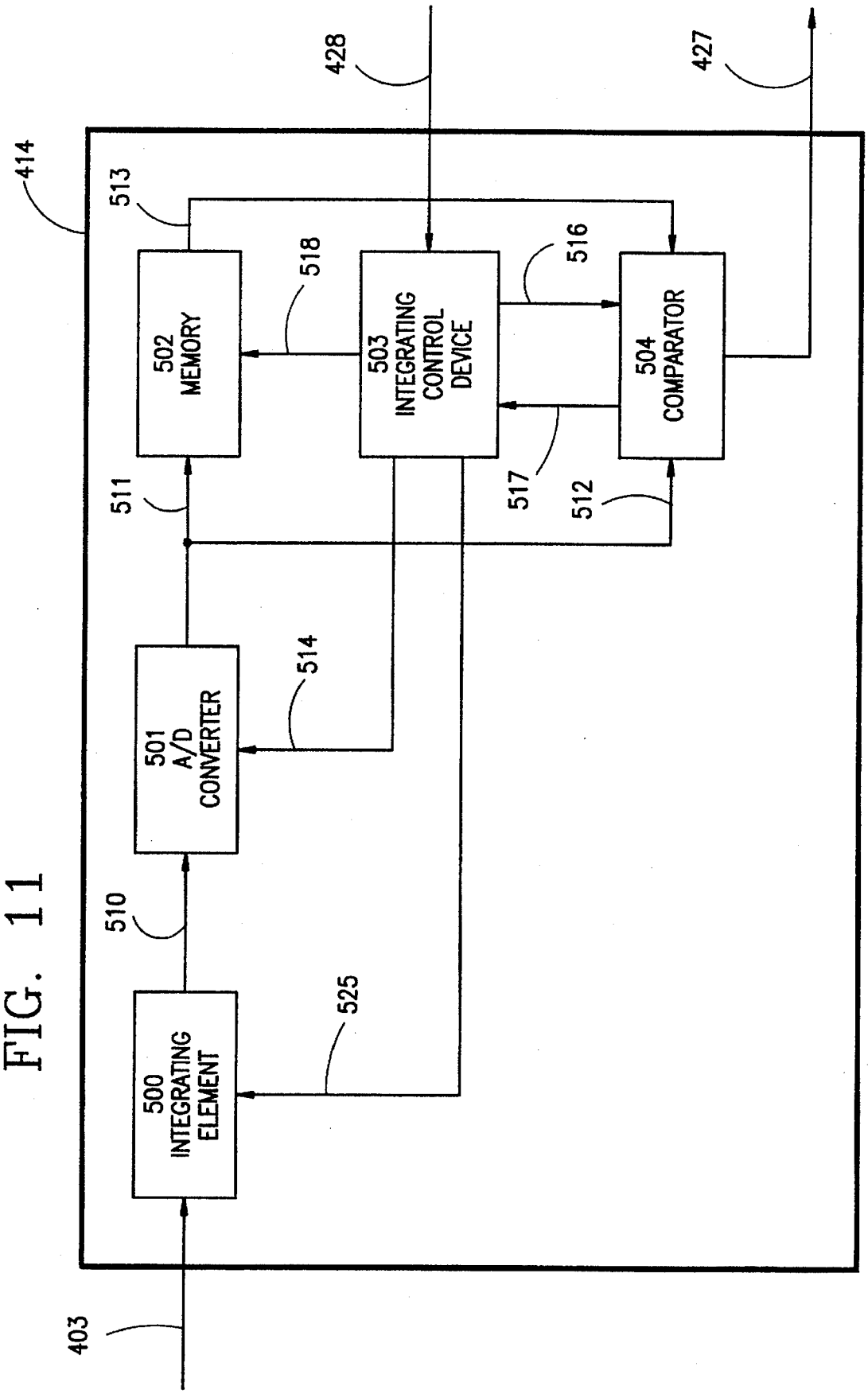
FIG. 11 is a functional block diagram of the integrator.

FIG. 11 shows the design of the integrator 414. An integrating element 500 is connected by the signal cable 403 to the line detector control logic 410 (see FIG.10 ). The signal cable 403 transmits the image data from the line detector 10. The integrating element 500 forms the integral from the image data of the line detector 10.

The integration element 500 is connected by a signal cable 510 to an analog/digital converter 501 into a digital signal. The integrating element 500 transmits the input-signal integral through the signal cable 510 to the analog/digital converter 501. The analog-digital converter 501 converts the integration result into a digital sum.

The analog/digital converter 501 is connected by a signal cable 511 to a memory 502. The analog/digital converter 501 is connected by a signal cable 512 to a comparator 504.

The digital output signal from the analog/digital converter 501 is transmitted through the signal cable 511 to the memory 502. The digital output signal from the analog/digital converter 501 is connected by a signal cable 512 to a comparator 504.

The digital output signal from the analog/digital converter 501 is transmitted through the signal cable 511 to the memory 502. The digital output signal from the analog/digital converter 501 is transmitted through the signal cable 512 to the comparator 504.

Selected integral results are stored in the memory 502. The selection is made by an integration control device 503.

The memory 502 is connected by a signal cable 513 to the comparator 504. Selected reference values for the integral of a measurement cycle are transmitted through the cable 513 to the comparator 504.

The comparator 504 compares the integral from the last, complete measurement cycle with the integral of a measurement cycle such that it is known no projectile flew through the target plane, The comparator 504 is connected by a signal cable 516 to the integrating control device 503. The comparator 504 is connected by a signal cable 517 to the integrating control device 503.

The integrating control device 503 synchronizes the comparison operation through the signal cable 516. The comparator transmits the comparison result through the signal cable 517.

The integration control device 503 is connected by a signal cable 518 to the memory 502. Through the signal cable 518, the integration control device 503 controls the storage of the integration results through the signal cable 511 into the memory 502, and the retrieval of the integration results as reference values for the comparator 504 through the signal cable 513.

The integration control device 503 is connected by a signal cable 514 to the analog/digital converter 501. The integration control device 503 drives the analog/digital converter 501 in such manner that it always shall convert the integration result into a digital value at the end of an integration cycle.

The integration control device 503 is connected by a signal cable 515 to the integrating element 500. The integration control device 503 drives the integrating element 500 through the signal cable 515 in such manner that the integration element 500 is reset at the beginning of a scan of the line detector 10 and that it forms an integral value from the data of one scan cycle.

The analytical control device 416 is connected by a signal cable 428 to the integrating control device 503. The analytical control device 416 communicates the synchronizing data for the sequences to the integrating control device 503 through the signal cable 428.

The comparator 504 is connected by the signal cable 427 to the analytical control device 416. The comparator 504 communicates the comparison result to the analytical control device 416 through the signal cable 427.

Although the invention has been illustrated and described in detail herein, it is to be understood that various changes and modifications may be made therein without departing from the spirit and scope of the invention as defined in the appended claims.

What is claimed is:

1. A method for detecting the spatial position of a projectile passing through a target plane, comprising the steps of:

generating at least two light zones angularly intersecting one another;

sweeping the target plane with said at least two angularly intersecting light zones;

passing a projectile through the target plane illuminated by said at least two angularly intersecting light zones and producing shadow images of the projectile on screen means;

detecting the shadow images on said screen means by spatially resolving photodetector means to obtain a signal representative of the location of the projectile in the target plane; and electronically analyzing the signal to determine the location of the projectile in the tarrier plane.

2. A method as defined in claim 1, wherein:

at least two fans of light are generated, and the shadow images on said screen means are detected by at least one line detector comprising a charge-coupled device (CCD).

3. A method as defined in claim 1, wherein:

the light zones are produced by a first slit-aperture mounted in front of a light source, and the light from the light zones subsequently is made to pass through a second slit-aperture mounted in front of said screen means.

4. A method as defined in claim 2, wherein:

the light fans are produced by a first slit-aperture mounted in front of a light source, and the light from the light fans subsequently is made to pass through a second slit-aperture mounted in front of said screen means.

5. A method as defined in claim 1, wherein:

the light zones are generated from at least one light source; and the light from said at least one light source is concentrated through a first optic means, and the shadow images on said screen means are imaged by a second optic means onto said at least one photodetector.

6. A method as defined in claim 2, wherein:

the fans of light are generated from at least one light source; and the light from said at least one light source is concentrated through a first optic means, and the shadow images on said screen means are imaged by a second optic means onto said at least one photodetector.

7. A method as defined in claim 3, wherein:

the light zones are generated from at least one light source; and the light from said at least one light source is concentrated through a first optic means, and the shadow images on said screen means are imaged by a second optic means onto said at least one photodetector.

8. A method as defined in claim 1, wherein:

the location of the projectile in the target plane is determined from the location of its shadow images as detected by said at least one photodetector and from the mutual positions of the two light zones in particular by means of geometric optics.

9. Apparatus for detecting a projectile passing through a target plane, comprising:

light source means for generating at least two light zones sweeping the target plane and subtending a specified angle relative to one another;

screen means in the target plane and opposite said light source means, whereby shadow images of said projectile are projected onto said screen means; and spatially resolving photodetector means mounted behind said screen means to detect said shadow images.

10. Apparatus as defined in claim 9, wherein:

said light source means generates at least two angularly intersecting fans of light; and said photodetector means is a charge-coupled device line detector.

11. Apparatus as defined in claim 9, wherein:

a slit-aperture is mounted in front of said light source means and in front of said screen means.

12. Apparatus as defined in claim 10, wherein:

a slit-aperture is mounted in front of said light source means and in front of said screen means.

13. Apparatus as defined in claim 11, wherein:

the slit-aperture is such that the projectile cannot pass through it.

14. Apparatus as defined in claim 9, wherein:

there are two orthogonally arranged slit-apertures, and two light source means, one associated with each of said slit-apertures.

15. Apparatus as defined in claim 14, wherein:

screen means is associated with light source means and photodetector means is associated with said screen means and a lens means is mounted between each light source means and the associated slit-aperture, and between said screen means and the associated photodetector means.

16. Apparatus as defined in claim 10, wherein:

there are two orthogonally arranged slit-apertures, and two light source means, one associated with each of said slit-apertures.

17. Apparatus as defined in claim 11, wherein:

there are two orthogonally arranged slit-apertures, and two light source means, one associated with each of said slit-apertures.

* * * * *